3,326,876
PROCESS FOR DECOLORIZING DIPENTENE POLYMERS

Henry G. Sellers, Jr., Pensacola, Fla., assignor to Tenneco Chemicals, Inc., a corporation of Delaware
No Drawing. Filed Jan. 8, 1964, Ser. No. 336,387
6 Claims. (Cl. 260—93.3)

This invention relates to dipentene polymers and more particularly to a process for the decolorization of dipentene polymers.

It is well known that dipentene can be polymerized to form resinous products that are useful in the manufacture of paper coatings, adhesives, rubber compounds, and other industrial products. Heretofore, however, the preparation of dipentene polymers that are very light in color has been difficult and expensive since the use of highly purified raw materials and extremely careful control of process conditions are required. In addition no satisfactory process for refining the relatively dark dipentene polymers to produce light-colored products has been known.

It is an object of this invention to provide a process for the decolorization of dipentene polymers. It is a further object of this invention to provide a process for the decolorization of dipentene polymers which is simple and economical. Another object of this invention is to provide a process for treating dipentene polymers wherein the physical properties of the treated polymers other than color remain substantially unchanged. Other objects will be apparent from the detailed description of the invention that follows.

These objects may be accomplished in accordance with the present invention by contacting dipentene polymers with a Raney nickel catalyst. As the result of this treatment, the color of the dipentene polymers is substantially lightened without an accompanying loss in yield and with no perceptible effect on the other physical properties of the polymers.

The treatment of the dipentene polymers is carried out under conditions that will provide intimate contact between the polymers and the Raney nickel catalyst. This may be accomplished by adding the catalyst to a solution of the dipentene polymers in a suitable solvent or to the polymers in the molten state. After such treatment, the polymer solutions or the molten polymers are separated from the Raney nickel catalyst and recovered from the solvent if one has been used.

The process of this invention is applicable to dipentene polymers which may be prepared by any known and convenient procedure. For example, dipentene may be polymerized in solution in the presence of a Friedel-Crafts catalyst, such as aluminum chloride, aluminum bromide, stannic chloride, antimony trichloride, ferric chloride, boron trifluoride, or beryllium chloride. When the polymerization step has been completed, the polymer solution may be treated with lime and with an adsorbent material, such as fuller's earth or finely-divided clay, and then heated to dechlorinate it. After filtration, the filtrate may be distilled to remove the solvent and yield the dipentene polymer. If desired, this distillation step may be omitted, and the filtration without further purification may be treated with a Raney nickel catalyst to decolorize it.

In a preferred embodiment of this invention, a dipentene polymer prepared by the aforementioned procedure is dissolved in an inert organic solvent. The polymer solution is treated with a Raney nickel catalyst and then filtered to remove the catalyst. The filtrate is heated to distill off the solvent and yield a decolorized dipentene polymer.

Any solvent that will dissolve the dipentene polymer and that is inert when treated with a Raney nickel catalyst under the conditions set forth hereinafter may be used in the present process. Suitable solvents include monocyclic aromatic hydrocarbons, such as benzene, toluene, or xylene; aliphatic hydrocarbons, such as gasoline, petroleum naphtha, pentane, hexane, heptane, or octane; cyclic hydrocarbons, such as decahydronaphthalene, cyclohexane, and methylcyclohexane; terpene hydrocarbons, such as p-menthane; halogenated hydrocarbons, such as methyl chloride, methylene dichloride, chloroform, carbon tetrachloride, ethyl chloride, ethyl bromide, ethylidene dichloride, and 1,2,2-trichloroethylene; and esters, such as butyl acetate and amyl acetate. A single solvent or a mixture of two or more of these solvents may be used. It is generally preferred that the solvent be a hydrocarbon that has a boiling point below approximately 200° C. since such solvents may be readily separated from the treated polymer by distillation without danger of overheating and consequently darkening the polymer.

The concentration of the dipentene polymer in the solution is not critical and is usually that which will provide solutions having the desired handling characteristics. In most cases the solution contains approximately 10% to 75% by weight of the polymer with the concentration in each case dependent upon such factors as the choice of solvent, the molecular weight of the polymer, and the viscosity desired. When a hydrocarbon solvent is used, the solution preferably contains 30% to 60% by weight of the dipentene polymer.

The Raney nickel catalyst with which the dipentene polymer solution is contacted may be prepared by the reaction of a nickel aluminum alloy with a sodium hydroxide solution. A typical procedure for its preparation, which is described in "Organic Synthesis," vol. III, page 181 (John Wiley and Sons, Inc.), yields an aqueous suspension of the catalyst. Since the presence of water is not desirable in the dipentene polymer solution, the catalyst is de-watered prior to its use in the present process. This may be done, for example, by washing the wet Raney nickel at least twice with methanol and then at least twice with one or more of the aforementioned hydrocarbon solvents. Following its use in this decolorizing process, the Raney nickel catalyst may be recovered and reused in a subsequent decolorization of a dipentene polymer. The amount of the Raney nickel catalyst that is used is generally approximately 5% to 50% of the weight of the dipentene polymer. Larger amounts of the catalyst may be present, but there is no particular advantage to their use.

The conditions under which the decolorization is carried out are not critical. The process may be carried out at temperatures ranging from approximately 0° C. to the boiling point of the solvent at atmospheric pressure or at superatmospheric pressures. It is generally most convenient to carry out the decolorization at temperatures between approximately 25° C. and 120° C. and at atmospheric pressure. The decolorization of the dipentene polymer takes place rapidly and is usually complete within an hour of the start of the treatment. In many cases substantial decolorization is obtained after a 5-minute to 30-minute treatment of the polymer solution with the Raney nickel catalyst.

Following the decolorization process, the Raney nickel catalyst may be separated from the polymer by filtration or other known techniques. Then the solvent, if one is present, may be separated from the polymer by distillation, preferably with the aid of steam sparging.

This invention is further illustrated by the examples that follow. It is to be understood, however, that these examples are given solely for the purpose of illustration and that the invention is not to be regarded as being limited to any of the specific materials or conditions recited therein except as set forth in the appended claims. In the examples all parts and percentages are parts and percentages by weight. The APHA colors shown in the examples were determined by means of a test procedure set forth by the American Public Health Association as reported in "Standard Methods for the Examination of Water and Sewage", 9th Edition; 1946, pages 14 and 15.

*Example 1*

A dipentene polymer was prepared by the following procedure: To a mixture of 10 parts of aluminum chloride, 250 parts of toluene, and 250 parts of petroleum naphtha (b.p. 118°–148° C.) was added 500 parts of dipentene. The reaction mixture was agitated and maintained at a temperature of 40° C.–45° C. during the addition of the dipentene. When the addition of the dipentene was complete, the mixture was allowed to stand for one hour. Then 25 parts of calcium hydroxide and 25 parts of acid-treated clay were added. The resulting mixture was heated with agitation until approximately half of the solvent had distilled off and then at its reflux temperature for 15 hours without the removal of any additional solvent. Following hot filtration, the mixture was heated to a pot temperature of 220° C., sparged with steam until 500 parts of water was present in the distillate, and cooled to room temperature. There was obtained 350 parts of a solid dipentene polymer that had a ball and ring softening point (ASTM E-28-51T) of 113° C.

*Example 2*

One hundred parts of a dipentene polymer prepared by the procedure described in Example 1 was dissolved in 100 parts of petroleum naphtha. To this solution, which had an APHA color of 120, was added 10 parts of a Raney nickel catalyst. The resulting mixture was stirred and heated to its reflux temperature (120° C.) and then cooled to room temperature. After filtration, the solution had an APHA color of 80.

*Example 3*

One hundred parts of a dipentene polymer prepared by the procedure described in Example 1 was dissolved in 100 parts of petroleum naphtha. To this solution, which had an APHA color of 120, was added 20 parts of a Raney nickel catalyst. The resulting mixture was stirred and heated to its reflux temperature (120° C.) and then cooled to room temperature. After filtration, the solution had an APHA color of 45. This solution was heated to 200° C. and sparged with steam to remove the solvent. Nitrogen was then bubbled through the molten resin to remove moisture from it. Upon cooling, there was obtained a clear, substantially water-white dipentene polymer that had a softening point of 113° C.

*Example 4*

One hundred parts of a dipentene polymer prepared by the procedure described in Example 1 was dissolved in a solvent mixture containing 50 parts of petroleum naphtha and 50 parts of toluene. To this solution, which had an APHA color of 120, was added 20 parts of a Raney nickel catalyst. The resulting mixture was stirred at 25° C. for 10 minutes and then filtered. The filtrate had an APHA color of 60. Upon removal of the solvents by the procedure described in Example 3, there was obtained a clear, substantially water-white solid dipentene polymer.

*Example 5*

One hundred parts of a dipentene polymer prepared by the procedure described in Example 1 was dissolved in 50 parts of petroleum naphtha and 50 parts of toluene. To this solution, which had an APHA color of 120, was added 20 parts of a Raney nickel catalyst. The resulting mixture was stirred at 50° C. for 10 minutes and then filtered. The filtrate had an APHA color of 60. Upon removal of the solvents by the procedure described in Example 3, there was obtained a clear, substantially water-white solid dipentene polymer.

What is claimed is:

1. The process of decolorizing dipentene polymers which comprises contacting said dipentene polymer with a treating agent consisting of a Raney nickel catalyst.

2. The process of decolorizing dipentene polymers which comprises contacting a solution of said polymers with approximately 5% to 50%, based on the weight of said polymer, of a treating agent consisting of a Raney nickel catalyst.

3. The process of decolorizing dipentene polymers which comprises the steps of forming a solution of said polymer in an inert solvent and contacting said solution with approximately 5% to 50%, based on the weight of said polymer, of a treating agent consisting of a Raney nickel catalyst at a temperature between approximately 0° C. and the boiling point of the solvent.

4. The process of decolorizing dipentene polymers which comprises the steps of contacting a solution of said polymer with approximately 5% to 50%, based on the weight of said polymer, of a treating agent consisting of a Raney nickel catalyst at a temperature between approximately 25° C. and 120° C., filtering the solution so treated, and distilling the filtrate so obtained to recover the decolorized dipentene polymer.

5. The process of decolorizing dipentene polymers which comprises the steps of contacting a solution containing 10% to 75% by weight of a dipentene polymer with approximately 5% to 50%, based on the weight of said polymer, of a treating agent consisting of a Raney nickel catalyst at a temperature between approximately 25° C. and 120° C., filtering the solution so treated, and distilling the filtrate so obtained to recover the decolorized dipentene polymer.

6. The process of decolorizing dipentene polymers which comprises the steps of contacting a solution containing 30% to 60% by weight of said dipentene polymer in a hydrocarbon solvent with approximately 5% to 50%, based on the weight of said polymer, of a treating agent consisting of a Raney nickel catalyst at a temperature between approximately 25° C. and 120° C., filtering the solution so treated, and distilling the filtrate so obtained to recover the decolorized dipentene polymer.

References Cited

UNITED STATES PATENTS 2,249,112  7/1941  Carmody _____ 260—93.3

JOSEPH L. SCHOFER, *Primary Examiner.*

LAWRENCE EDELMAN, *Assistant Examiner.*